United States Patent
Underwood et al.

(10) Patent No.: US 11,150,782 B1
(45) Date of Patent: Oct. 19, 2021

(54) CHANNEL NAVIGATION OVERVIEWS

(71) Applicant: Facebook, Inc., Menlo Park, CA (US)

(72) Inventors: Patrick Joseph Roark Underwood, San Francisco, CA (US); Geoff David Joseph Teehan, Palo Alto, CA (US); George Lewis Kedenburg, III, San Francisco, CA (US); Jason Holland, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/358,032

(22) Filed: Mar. 19, 2019

(51) Int. Cl.
*G06F 3/0482* (2013.01)
*G06F 16/957* (2019.01)
*G06F 16/954* (2019.01)

(52) U.S. Cl.
CPC .......... *G06F 3/0482* (2013.01); *G06F 16/954* (2019.01); *G06F 16/9577* (2019.01)

(58) Field of Classification Search
CPC ........ G06N 20/00; G06N 3/08; G06N 3/0445; G06N 3/0454; G06N 20/20; G06N 5/04; G06N 20/10; G06N 3/006; G06N 3/02; G06N 3/0472; G06N 3/084; G06N 3/088; G06N 5/003; G06N 5/02; G06N 5/045; G06N 5/046; G06N 7/005
See application file for complete search history.

(56) References Cited

U.S. PATENT DOCUMENTS

| | | | |
|---|---|---|---|
| D599,366 S | 9/2009 | Brown et al. | |
| D599,368 S | 9/2009 | Kanga et al. | |
| D608,365 S | 1/2010 | Walsh et al. | |
| D614,643 S | 4/2010 | Viegers et al. | |
| D648,735 S | 11/2011 | Arnold et al. | |
| D651,608 S | 1/2012 | Allen et al. | |
| D664,561 S | 7/2012 | Gleasman et al. | |
| D664,988 S | 8/2012 | Gleasman et al. | |
| D692,456 S | 10/2013 | Brinda et al. | |
| D692,915 S | 11/2013 | Brinda et al. | |

(Continued)

FOREIGN PATENT DOCUMENTS

WO 2015/149375 A1 10/2015

OTHER PUBLICATIONS

Preinterview First Office Action received for U.S. Appl. No. 16/358,380 dated Aug. 5, 2020, 13 pages.

(Continued)

*Primary Examiner* — Di Xiao
(74) *Attorney, Agent, or Firm* — FisherBroyles, LLP

(57) ABSTRACT

The disclosed computer-implemented method may include accessing content channels available to a user, where each content channel includes a communication space with at least one specified type of content and an audience with various audience members. The method may also include generating a channel overview that provides context information related to the content channels available to the user. The channel overview may include a navigable list of the accessed content channels. The method may further include receiving a selection input indicating that a specified content channel has been selected from the channel overview. The method may also include navigating to the selected content channel from the channel overview. Various other methods, systems, and computer-readable media are also disclosed.

20 Claims, 17 Drawing Sheets

(56) References Cited

U.S. PATENT DOCUMENTS

| | | |
|---|---|---|
| D699,744 S | 2/2014 | Ho Kushner et al. |
| 8,645,463 B2 * | 2/2014 | Knight .................. H04L 51/04 709/204 |
| D701,227 S | 3/2014 | Lee |
| D716,339 S | 10/2014 | Lee |
| D730,383 S | 5/2015 | Brinda et al. |
| D730,386 S | 5/2015 | Ryan et al. |
| D736,247 S | 8/2015 | Chen et al. |
| D736,248 S | 8/2015 | Chen et al. |
| D746,866 S | 1/2016 | Memoria et al. |
| D753,709 S | 4/2016 | Kawanabe |
| D755,239 S | 5/2016 | Lee et al. |
| D755,814 S | 5/2016 | Rad et al. |
| D757,086 S | 5/2016 | Kang |
| D759,666 S | 6/2016 | Kuhn et al. |
| D762,671 S | 8/2016 | Chan et al. |
| D765,101 S | 8/2016 | Park et al. |
| D766,308 S | 9/2016 | Park et al. |
| D769,295 S | 10/2016 | Han et al. |
| D769,306 S | 10/2016 | Bowen et al. |
| D781,328 S | 3/2017 | Fong et al. |
| D785,028 S | 4/2017 | Federighi et al. |
| D785,643 S | 5/2017 | Boa et al. |
| D789,396 S | 6/2017 | Alonso Ruiz et al. |
| D789,969 S | 6/2017 | Chaudhri et al. |
| D789,983 S | 6/2017 | Kim |
| D794,651 S | 8/2017 | Cavander et al. |
| D798,331 S | 9/2017 | Fong et al. |
| D800,754 S | 10/2017 | De Cock et al. |
| D803,869 S | 11/2017 | Kuhn et al. |
| D806,741 S | 1/2018 | Majernik et al. |
| D807,898 S | 1/2018 | Memoria et al. |
| D808,413 S | 1/2018 | Wu et al. |
| D809,003 S | 1/2018 | Sowden et al. |
| D815,130 S | 4/2018 | Phillips et al. |
| D815,666 S | 4/2018 | Burns |
| D816,110 S | 4/2018 | Choi et al. |
| D816,701 S | 5/2018 | Ball et al. |
| D817,972 S | 5/2018 | Karunamuni et al. |
| 9,998,796 B1 | 6/2018 | Kedenburg, III et al. |
| 10,009,308 B2 | 6/2018 | Brunn et al. |
| D824,944 S | 8/2018 | Sagrillo et al. |
| D825,594 S | 8/2018 | Wu et al. |
| D831,059 S | 10/2018 | Bao |
| D832,876 S | 11/2018 | Chung et al. |
| D834,602 S | 11/2018 | Bao |
| D836,118 S | 12/2018 | Patel |
| D836,121 S | 12/2018 | Leong et al. |
| D842,867 S | 3/2019 | Jedrzejowicz et al. |
| D845,324 S | 4/2019 | Hemsley et al. |
| D847,855 S | 5/2019 | Majernik et al. |
| D853,431 S | 7/2019 | Sagrillo et al. |
| D854,031 S | 7/2019 | Alvarez et al. |
| D858,552 S | 9/2019 | Westerhold et al. |
| D859,446 S | 9/2019 | Westerhold et al. |
| D859,450 S | 9/2019 | Krishna |
| D860,227 S | 9/2019 | Fung et al. |
| D860,233 S | 9/2019 | Chaudhri et al. |
| D862,501 S | 10/2019 | Patel |
| D863,324 S | 10/2019 | Kang et al. |
| D868,804 S | 12/2019 | Bragdon |
| D870,141 S | 12/2019 | Bowden et al. |
| D877,762 S | 3/2020 | Feng et al. |
| D879,127 S | 3/2020 | Feng et al. |
| D879,829 S | 3/2020 | Amini et al. |
| D881,219 S | 4/2020 | Ngo et al. |
| D881,220 S | 4/2020 | Feng et al. |
| D882,593 S | 4/2020 | Fatnani et al. |
| D882,608 S | 4/2020 | Murphy et al. |
| D882,609 S | 4/2020 | Murphy et al. |
| D882,612 S | 4/2020 | Antillon et al. |
| D882,613 S | 4/2020 | Zumbrunnen et al. |
| 10,623,917 B1 | 4/2020 | Paul |
| D885,410 S | 5/2020 | Butler |
| D885,421 S | 5/2020 | Lunaparra et al. |
| D886,128 S | 6/2020 | Fatnani et al. |
| D887,428 S | 6/2020 | Fatnani et al. |
| D890,198 S | 7/2020 | Paul |
| D890,204 S | 7/2020 | Bussière et al. |
| D894,206 S | 8/2020 | Naruns et al. |
| D895,664 S | 9/2020 | Baber et al. |
| D900,833 S | 11/2020 | Alonso Ruiz et al. |
| D900,845 S | 11/2020 | Tomori |
| D904,426 S | 12/2020 | Paul |
| D904,431 S | 12/2020 | Park et al. |
| D904,432 S | 12/2020 | Park et al. |
| D905,095 S | 12/2020 | Park et al. |
| 10,852,915 B1 | 12/2020 | Behzadi et al. |
| 10,868,788 B1 | 12/2020 | Underwood et al. |
| D910,054 S | 2/2021 | Silfver et al. |
| D910,064 S | 2/2021 | Paul |
| D912,075 S | 3/2021 | Sharp et al. |
| D913,304 S | 3/2021 | VanDuyn et al. |
| D913,306 S | 3/2021 | Davern et al. |
| D913,314 S | 3/2021 | Paul |
| D914,726 S | 3/2021 | Gouliard et al. |
| D914,741 S | 3/2021 | Anzures et al. |
| D915,440 S | 4/2021 | Kim et al. |
| D916,884 S | 4/2021 | Dascola et al. |
| 2004/0021673 A1 | 2/2004 | Alessi et al. |
| 2008/0034307 A1 | 2/2008 | Cisler et al. |
| 2009/0148124 A1 | 6/2009 | Athsani et al. |
| 2009/0177754 A1 | 7/2009 | Brezina et al. |
| 2009/0216859 A1 | 8/2009 | Dolling |
| 2009/0313578 A1 | 12/2009 | Roh et al. |
| 2009/0327939 A1 | 12/2009 | Johns et al. |
| 2010/0211872 A1 | 8/2010 | Rolston et al. |
| 2010/0231533 A1 | 9/2010 | Chaudhri |
| 2011/0010182 A1 | 1/2011 | Turski et al. |
| 2011/0010659 A1 | 1/2011 | Kim et al. |
| 2011/0016417 A1 | 1/2011 | Shiplacoff et al. |
| 2011/0252381 A1 | 10/2011 | Chaudhri |
| 2011/0271328 A1 | 11/2011 | Sutton-Shearer |
| 2011/0283304 A1 * | 11/2011 | Roberts .................. H04H 60/46 725/9 |
| 2011/0289067 A1 * | 11/2011 | Jordan ................ G06F 16/3323 707/707 |
| 2012/0005224 A1 | 1/2012 | Ahrens et al. |
| 2012/0089950 A1 | 4/2012 | Tseng |
| 2012/0110052 A1 | 5/2012 | Smarr et al. |
| 2012/0110621 A1 | 5/2012 | Gossweiler, III |
| 2012/0151322 A1 | 6/2012 | Lindsay et al. |
| 2012/0151342 A1 | 6/2012 | Trotta et al. |
| 2012/0151415 A1 | 6/2012 | Park et al. |
| 2012/0210386 A1 * | 8/2012 | Kim .................. H04N 21/4622 725/148 |
| 2012/0271883 A1 | 10/2012 | Montoya et al. |
| 2013/0073976 A1 | 3/2013 | McDonald et al. |
| 2013/0097556 A1 | 4/2013 | Louch |
| 2013/0106903 A1 | 5/2013 | Nagata et al. |
| 2013/0145291 A1 | 6/2013 | Weber et al. |
| 2013/0254709 A1 | 9/2013 | Koshimae et al. |
| 2013/0312027 A1 | 11/2013 | Baumel et al. |
| 2014/0032672 A1 | 1/2014 | Yoshikawa et al. |
| 2014/0047074 A1 | 2/2014 | Chung et al. |
| 2014/0049692 A1 | 2/2014 | Sirpal et al. |
| 2014/0189010 A1 | 7/2014 | Brown et al. |
| 2014/0244659 A1 | 8/2014 | Liu et al. |
| 2014/0258110 A1 | 9/2014 | Davis et al. |
| 2014/0282208 A1 | 9/2014 | Chaudhri |
| 2014/0317116 A1 | 10/2014 | Shah et al. |
| 2014/0317201 A1 | 10/2014 | McNeil et al. |
| 2014/0317660 A1 * | 10/2014 | Cheung .............. H04N 21/6175 725/44 |
| 2014/0359789 A1 | 12/2014 | Pitt |
| 2015/0022558 A1 | 1/2015 | Li |
| 2015/0049591 A1 | 2/2015 | Adams et al. |
| 2015/0113436 A1 | 4/2015 | Penha et al. |
| 2015/0154676 A1 | 6/2015 | Matousek et al. |
| 2015/0200985 A1 | 7/2015 | Feldman et al. |
| 2015/0370798 A1 | 12/2015 | Ju et al. |
| 2016/0057154 A1 | 2/2016 | Ferguson et al. |
| 2016/0171453 A1 | 6/2016 | Zorfas |
| 2016/0197993 A1 | 7/2016 | Perkowski et al. |

(56) References Cited

U.S. PATENT DOCUMENTS

| | | | |
|---|---|---|---|
| 2016/0232600 A1 | 8/2016 | Purves |
| 2016/0330258 A1 | 11/2016 | Sandhu |
| 2016/0337291 A1 | 11/2016 | Park et al. |
| 2016/0357305 A1 | 12/2016 | Wells et al. |
| 2016/0357368 A1 | 12/2016 | Federighi et al. |
| 2016/0373455 A1 | 12/2016 | Shokhrin et al. |
| 2016/0380952 A1 | 12/2016 | Vora et al. |
| 2017/0060349 A1 | 3/2017 | Munoz et al. |
| 2017/0131864 A1 | 5/2017 | Edgar |
| 2017/0164063 A1 | 6/2017 | Lewis et al. |
| 2017/0180299 A1 | 6/2017 | Garza |
| 2017/0195736 A1 | 7/2017 | Chai et al. |
| 2017/0242899 A1 | 8/2017 | Jolley et al. |
| 2017/0270535 A1 | 9/2017 | McKee et al. |
| 2017/0295249 A1 | 10/2017 | Vickrey et al. |
| 2017/0315677 A1 | 11/2017 | Rice et al. |
| 2017/0359290 A1 | 12/2017 | Hsu et al. |
| 2018/0063278 A1 | 3/2018 | Helled et al. |
| 2018/0113579 A1 | 4/2018 | Johnston et al. |
| 2018/0121031 A1 | 5/2018 | Ta et al. |
| 2018/0174106 A1 | 6/2018 | Kenthapadi et al. |
| 2018/0192142 A1 | 7/2018 | Paul |
| 2018/0218160 A1 | 8/2018 | Wetherall et al. |
| 2018/0309806 A1* | 10/2018 | Huynh | H04L 65/403 |
| 2018/0349485 A1 | 12/2018 | Carlisle et al. |
| 2018/0349502 A1 | 12/2018 | Maycock |
| 2018/0365270 A1 | 12/2018 | Azout et al. |
| 2019/0095067 A1 | 3/2019 | Huang et al. |
| 2019/0335008 A1 | 10/2019 | Majoros et al. |
| 2020/0007675 A1 | 1/2020 | Khanukaev |
| 2020/0151815 A1 | 5/2020 | Whitfield |
| 2020/0211125 A1 | 7/2020 | McCuskey |
| 2020/0218413 A1 | 7/2020 | VanDuyn |
| 2020/0267435 A1 | 8/2020 | Gordon et al. |
| 2020/0326839 A1 | 10/2020 | Walkin et al. |
| 2021/0029131 A1 | 1/2021 | Mertens et al. |
| 2021/0097630 A1 | 4/2021 | Whilby |
| 2021/0105244 A1 | 4/2021 | O'Rourke et al. |

OTHER PUBLICATIONS

Holland, Jason, "Systems and Methods for Digital Content Navigation Based on Directional Input", U.S. Appl. No. 17/008,089, filed Aug. 31, 2020, 59 pages.

Holland, Jason, "Systems And Methods For Prioritizing Digital User Content Within a Graphical User Interface", U.S. Appl. No. 17/008,083, filed Aug. 31, 2020, 56 pages.

Preinterview First Office Action received for U.S. Appl. No. 16/358,962 dated Aug. 20, 2020, 14 pages.

Preinterview First Office Action received for U.S. Appl. No. 16/358,025 dated Apr. 30, 2020, 55 pages.

First Action Interview received for U.S. Appl. No. 16/358,025 dated Jul. 17, 2020, 55 pages.

Final Office Action received for U.S. Appl. No. 16/358,025 dated Sep. 2, 2020, 77 pages.

Holland, Jason, "Display Screen with a Graphical User Interface", U.S. Appl. No. 29/748,669, filed Aug. 31, 2020, 12 pages.

Holland, Jason, "Display Screen with a Graphical User Interface", U.S. Appl. No. 29/748,670, filed Aug. 31, 2020, 12 pages.

Preinterview First Office Action received for U.S. Appl. No. 16/361,631 dated Oct. 2, 2020, 28 pages.

Preinterview First Office Action received for U.S. Appl. No. 16/358,969 dated Apr. 2, 2020, 18 pages.

Final Office Action received for U.S. Appl. No. 16/358,969 dated Jun. 15, 2020, 18 pages.

Notice of Allowance received for U.S. Appl. No. 16/358,969 dated Aug. 25, 2020, 15 pages.

Underwood, Patrick Joseph Roark, "Systems And Methods For Generating Digital Channel Content", U.S. Appl. No. 17/084,690, filed Oct. 30, 2020, 40 pages.

Underwood et al., "Snap Scroll", U.S. Appl. No. 29/684,315, filed Mar. 20, 2019, 16 pages.

Underwood et al., "Fanning Interface", U.S. Appl. No. 29/684,316, filed Mar. 20, 2019, 13 pages.

Underwood et al., "Display Device with Graphical User Interface", U.S. Appl. No. 29/685,031, filed Mar. 26, 2019, 12 pages.

Underwood et al., "Display Device with Graphical User Interface", U.S. Appl. No. 29/685,030, filed Mar. 26, 2019, 12 pages.

Underwood et al., "Display Device with Graphical User Interface", U.S. Appl. No. 29/685,029, filed Mar. 26, 2019, 14 pages.

Underwood et al., "Bottom-Focused Channel Overview", U.S. Appl. No. 29/684,604, filed Mar. 22, 2019, 15 pages.

Underwood et al., "Bottom-Focused Channel", U.S. Appl. No. 29/684,606, filed Mar. 22, 2019, 13 pages.

Underwood et al., "Display Screen with Graphical User Interface", U.S. Appl. No. 29/685,028, filed Mar. 26, 2019, 14 pages.

Underwood et al., "Vertical To Horizontal Interface Flow", U.S. Appl. No. 29/684,609, filed Mar. 22, 2019, 13 pages.

Underwood et al., "Limited Screen to Full Screen Interface Flow", U.S. Appl. No. 29/684,610, filed Mar. 22, 2019, 14 pages.

Holland, Jason, "Display Screen with a Graphical User Interface", U.S. Appl. No. 29/748,663, filed Aug. 31, 2020, 13 pages.

Holland, Jason, "Display Screen with a Graphical User Interface", U.S. Appl. No. 29/748,664, filed Aug. 31, 2020, 12 pages.

Holland, Jason, "Display Screen with a Graphical User Interface", U.S. Appl. No. 29/748,668, filed Aug. 31, 2020, 12 pages.

Final Office Action received for U.S. Appl. No. 16/358,380 dated Apr. 15, 2021, 51 pages.

Non-Final Office Action received for U.S. Appl. No. 17/008,089 dated Mar. 19, 2021, 52 pages.

Peyton, "PS3 Tutorial: Game Menu", URL : https://www.youtube.com/watch?v=j30_ViiptsA, Jul. 29, 2012, 4 pages.

Final Office Action received for U.S. Appl. No. 16/358,962 dated Mar. 15, 2021, 37 pages.

Final Office Action received for U.S. Appl. No. 16/361,631 dated Apr. 8, 2021, 58 pages.

Ex Parte Quayle Action received for U.S. Appl. No. 29/684,315 dated Apr. 29, 2021, 87 pages.

Bergmann, Martha, Home Screen Sliding Animation, posted at dribbble, URL: <https://dribbble.com/shots/4328249-Home-Screen-Sliding-Animation-1-15> posting date Mar. 10, 2016. Site visited Apr. 22, 2021, 1 page.

Nugroho, Adi, "Daily UI Challenge #10 Simple Date App, posted at dribbble", URL: <https://dribbble.com/shots/3710148-Daily-UI-Challenge-10-Simple-Date-App> posting date Aug. 3, 2017. Site visited Apr. 22, 2021, 1 page.

Li, Zhi et al., Chinese design No. 303978893, published at Orbit, Dec. 12, 2016, 14 pages.

Yang, Jinlong, Chinese design No. 303329806, published at Orbit, Aug. 12, 2015, 7 pages.

Piao, Rongwan et al., Chinese design No. 303479533, published at Orbit, Dec. 2, 2015, 6 pages.

Kang, You-Jin et al., Korean design No. 300944195, published at Orbit, Feb. 13, 2018, 7 pages.

Rahimi, Ehsan, "Music Playlist App Interaction, posted at dribbble", URL: <https://dribbble.com/shots/4650389-Music-Playlist-App-I nteraction>, posting date May 30, 2018. Site visited Apr. 24, 2021, 1 page.

Ries, Vilem, "Wander app, posted at dribbble", URL: <https://dribbble.com/shots/5402223-Wander-app-interactions-2>, posting date Oct. 16, 2018. Site visited Apr. 24, 2021, 1 page.

Non-Final Office Action received for U.S. Appl. No. 29/684,316 dated Apr. 26, 2021, 75 pages.

Luo, Yi, "Chinese Design No. 304180173", published at Orbit, Jun. 16, 2017, 8 pages.

Song, Yuting, "Chinese Design No. 303841816", Sep. 7, 2016, 6 pages.

Liu, "Chinese Design No. 304005631", published at Orbit, Jan. 11, 2017, 4 pages.

Wang, Yufeng, "Chinese Design No. 303617576", Mar. 16, 2016, 7 pages.

(56) References Cited

OTHER PUBLICATIONS

Marcelino, Bruno, "Gestures Glamour: How to Set Up Swipeable Stacked Cards", URL: <https://www.outsystems.com/blog/posts/gestures_glamour_swipeable_stacked_cards/>, Mar. 9, 2018, 13 pages.

Perera, Nimasha, "Card Stack Animation—2, posted at dribbble", URL: <https://dribbble.com/shots/2377045-Card-Stack-Animation-2>, posting date Nov. 28, 2015. Site visited Apr. 20, 2021, 1 page.

Ex Parte Quayle Action received for U.S. Appl. No. 29/684,604 dated Apr. 27, 2021, 62 pages.

Gu, Fengtao, "Chinese design No. 304788552", Aug. 28, 2018, 5 pages.

Xiao, Yao Yao et al., "Chinese design No. 304992731, published at Orbit", Jan. 11, 2019, 5 pages.

Non-Final Office Action received for U.S. Appl. No. 29/684,606 dated Apr. 29, 2021, 79 pages.

Li, Xinrui et al., "Chinese design No. 304220928", Jul. 28, 2017, 9 pages.

Xin, "Chinese design No. 304619594, published at Orbit", May 8, 2018, 9 pages.

Wang, Hong et al., Chinese design No. 303670237, published at Orbit, publication date May 11, 2016. Site visited Apr. 21, 2021. Available from Internet. (Year: 2016), 6 pages.

Kalaska, Maciej, "RouteFinder app, posted at dribbble", URL: <https://dribbble.com/shots/6049671-RouteFinder-app> (Year: 2019), posting date Feb. 20, 2019. Site visited Apr. 24, 2021, 1 page.

Ex Parte Quayle Action received for U.S. Appl. No. 29/684,609 dated Apr. 28, 2021, 82 pages.

Non-Final Office Action received for U.S. Appl. No. 16/358,025 dated Mar. 1, 2021, 75 pages.

\* cited by examiner

CHANNEL NAVIGATION OVERVIEWS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
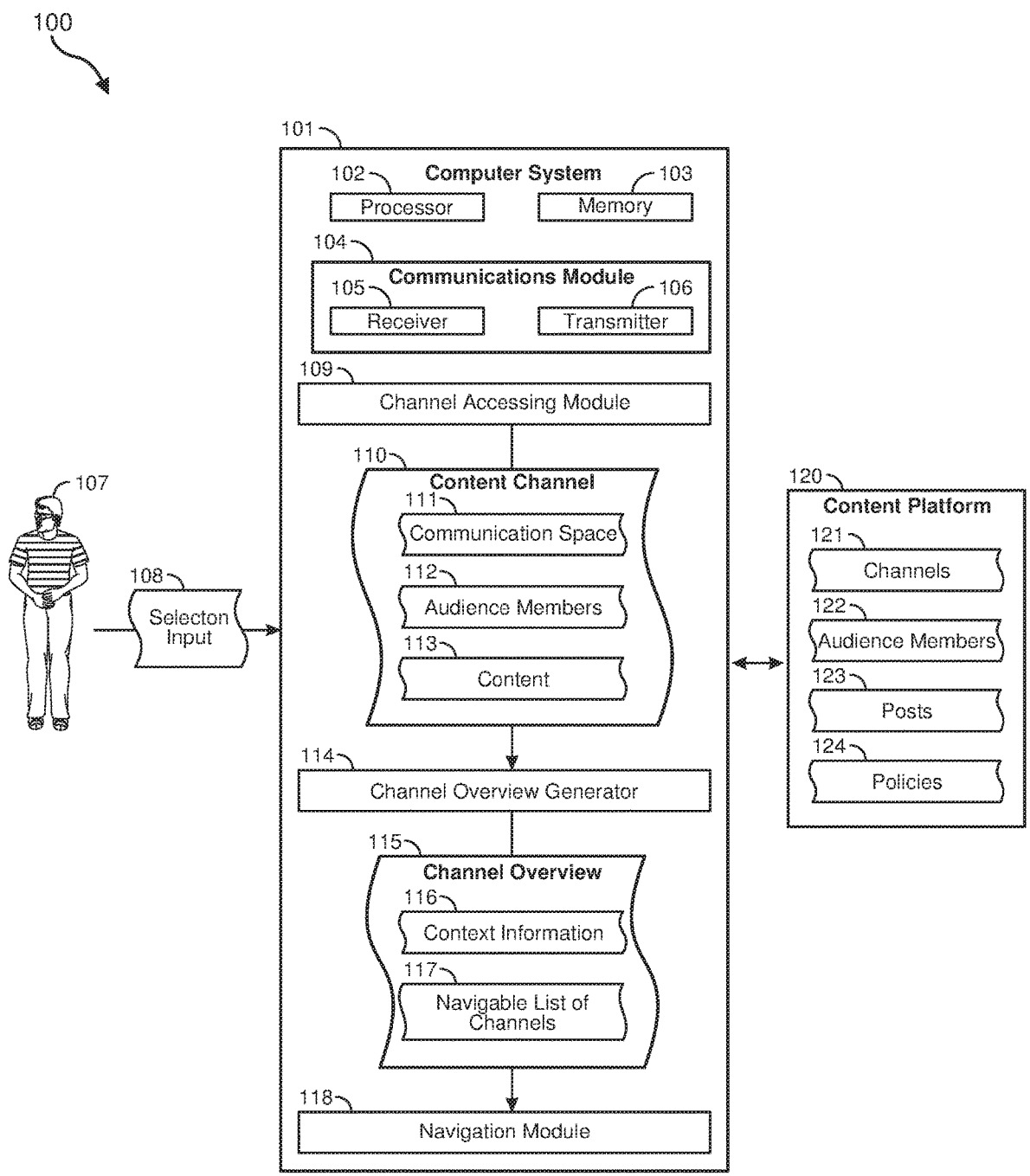
FIG. 1 illustrates a computing environment in which at least some of the embodiments herein may be implemented.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to generating and presenting a channel overview. As will be explained in greater detail below, embodiments of the instant disclosure may generate a channel overview that may allow users to navigate to various levels within a user interface including a post level and a channel feed level. The channel overview may provide a representation of different channels that may be accessible through the channel overview. The channels presented in the channel overview may include context information indicating what type of content may be found in each channel, who can see the channel's content, and how many user interactions have occurred relative to each channel. The channel overview may also allow users to navigate through the various social media posts that are associated with each channel. As such, viewing users may be aware of the content and audience of each channel before even browsing to those channels.

In at least some of the embodiments described herein, content including social media content may be presented in the form of channels. The term "channel," as used herein, may refer to any type or form of digital container, maintained by a social media platform, that is dedicated to storing social media compositions from a designated source. A source of social media compositions may include, without limitation, a user account, a predetermined set of user accounts, and/or a business account.

In some examples, the systems described herein may automatically create a primary channel for each user account that is registered with the social media platform. In these examples, the disclosed systems may maintain each primary channel as long as its corresponding user account is active. The disclosed systems may also allow a user to create and add social media compositions to one or more additional channels. In some examples, an additional channel may be permanent (e.g., configured to be maintained as long as the user account that created the additional channel is active). In other examples, an additional channel may be ephemeral (e.g., set to expire after a certain amount of time).

Each channel may be designated by a name that distinguishes the channel from other channels. In some examples, the name may be assigned to the channel automatically. For example, a primary channel may be automatically assigned the name associated with its corresponding user account (e.g., the primary account created for the user account of an individual named "Mindy Harris" may be "Mindy Harris.") In other examples, the name may be configurable by a user. For example, an additional channel may be assigned with a name submitted via user input at the time the additional channel is created.

In some examples, a channel may be limited to only storing social media compositions from a single source (e.g., only a single user account may have permission to add social media compositions to the channel). In other examples, a channel may be limited to only storing posts from a predetermined set of sources (e.g., a limited set of user accounts may have permission to add content to the channel). In one such example, a user account creating an additional channel may be given the option to add additional user accounts as contributors to the additional channel. In this example, the sources of the additional channel may be limited to the user account and the additional user accounts added by the user account. In other examples, a channel may be designated as an open channel to which any user account may add social media compositions.

In certain embodiments, a channel may be dedicated to storing compositions relating to a particular topic and/or theme. As a specific example, a news organization may create an open channel related to a particular news event and/or movement to which any user account may add content. In this specific example, the open channel may be dedicated to social media compositions associated with the particular news event and/or movement. As another specific example, a group of friends may create a group channel related to a vacation taken by the group. In this specific example, the group channel may be dedicated to social media compositions associated with the vacation.

In addition to storing social media compositions, channels may be used as a vehicle for sharing social media compositions. In some examples, an audience for a channel may be configurable. For example, a user may select an audience for a channel via a setting in his or her user account. In examples in which a user account may add social media compositions to multiple different channels, a user of the user account may select an audience (e.g., a different audience) for each of the channels. Additional features will now be described with regard to the computing architecture 100 of FIG. 1.

FIG. 1 illustrates a computing environment 100 in which many of the embodiments described herein may operate. The computing architecture 100 may include a computer system 101. The computer system 101 may include at least one processor 102 and at least some system memory 103.

The computer system 101 may be any type of local, embedded, or distributed computer system, including a cloud computer system. The computer system 101 may include program modules for performing a variety of different functions. The program modules may be hardware-based, software-based, or may include a combination of hardware and software. Each program module may use or represent computing hardware and/or software to perform specified functions, including those described herein below.

For example, a communications module 104 may be configured to communicate with other computer systems. The communications module 104 may include any wired or wireless communication means that can receive and/or transmit data to or from other computer systems. These communication means may include radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 404 may be configured to interact with databases, mobile computing devices (such as mobile phones or tablets), embedded systems, or other types of computing devices.

The computer system 101 may also include a channel accessing module 109. The channel accessing module 109 may be configured to access one or more channels 110. In some embodiments, content channel 110 may be one of many different content channels 121 provided by content platform 120. The content platform 120 may be any type of social media distribution platform or database or other data or application provider. The content platform 120 may include many different channels 121. Each channel may have an audience with specified audience members 122. In other cases, a channel may be open to the public and, as such, anyone with internet access may be able to view those channels. Each channel 121 may provide access to one or more posts 123. These posts 123 may be social media posts or other types of internet posts that may include text, pictures, videos, emojis, graphics, web pages, comments, chats, or other types of content. Each post may be provided within a channel 121 and may be navigable via a channel overview (e.g., 115).

Computer system 101 may include a channel overview generator 114 that may be configured to generate a channel overview 115. The channel overview 115 may include context information 116 related to the various channels that are accessible from within the channel overview 115. The channel overview 115 may also provide a navigable list of channels 117 available to the user 107. The list of channels 117 may include open channels as well as those channels to which a given user (e.g., 107) has access. The user 107 may brows the navigable list of channels 117 and select a channel to view in greater depth. The navigation module 118 may receive a selection input 108 from the user 107 and then navigate to the selected channel. From there, the user may view one or more posts that are available within the selected content channel 110.

In the embodiments described herein, a graphical user interface or, more specifically, an "interaction interface," may allow users to interact with and navigate content channels that are available to those users. In some cases, the interaction interface may include different hierarchical layers that provide navigational structure through which the user may navigate. For instance, the interaction interface may include a "channel feed level." At the channel feed level, the interaction interface may present a feed of one or more channels to which the user has access. Each channel within the channel feed may be represented by a channel preview. The channel preview may be an image, text, video or other representation of content related to the channel. Users may view the channel preview to determine whether they want to browse to the channel. If a user opts to browse to a channel, the user may provide a selection input that selects a specific channel from the channel feed.

Upon receiving this selection input, the interaction interface may navigate the user to a lower hierarchical level that may be referred to herein as a "channel overview level." The channel overview level may include the channel preview or may include other indicators such as a header or footer presenting the title of the selected channel. Other information may also be presented at the channel overview level including an indication of who created the channel, and indication of who is allowed to view and/or interact with the channel, an indication of new posts created for the channel, and perhaps other associated information. From within the channel overview layer, users may browse through different social media posts associated with the selected channel. If the user wants to view a specific post within the selected channel, the user may select that post and the interaction interface may navigate the user down another hierarchical level to the "post level" or "content level." At this post level, the user may view text, images, videos or other content associated with the post. The post level may also present other users' comments and reactions to the post. Different navigational features and options may be provided at each navigational level within the interaction interface, at least some of which may be controlled by policies or settings configurable by the creator of the channel. These features will be described in greater detail below with regard to method 200 of FIG. 2.

Figure 2:
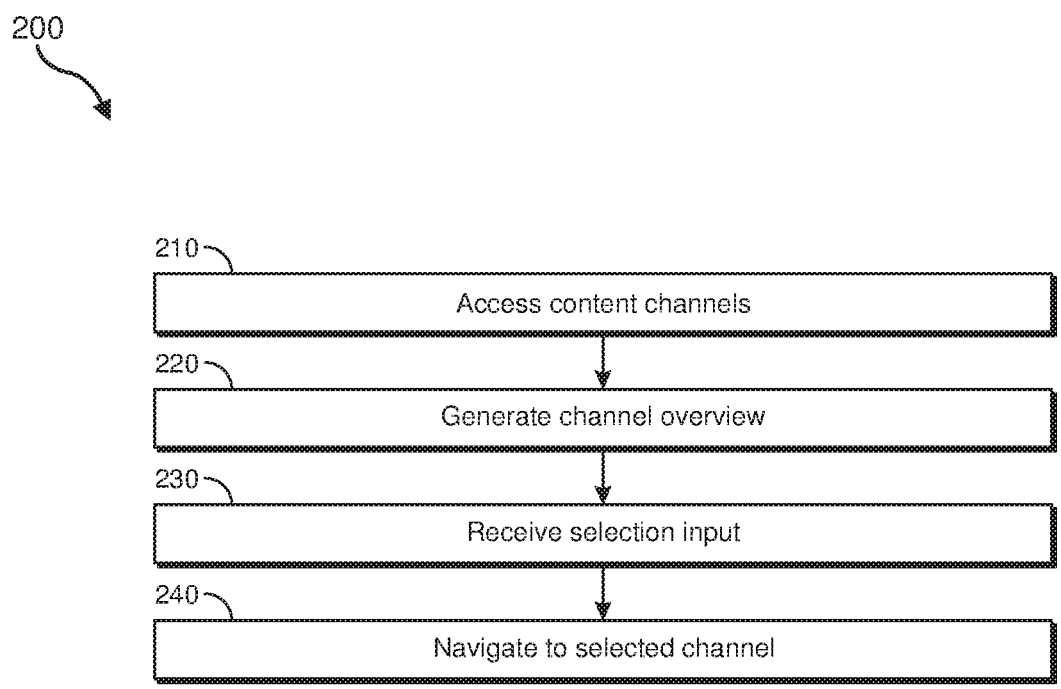
FIG. 2 is a flow diagram of an exemplary method for generating and presenting a channel overview.

FIG. 2 is a flow diagram of an exemplary computer-implemented method 200 for generating and presenting content in a channel overview. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may access content channels available to a user. For example, channel accessing module 109 of FIG. 1 may access content channel 110. The content channel 110 may be one of the channels 121 from content platform 120 or may be a channel from a different platform. The content channel 110 may include a communication space 111 with at least one specified type of content 113 and an audience with specified audience members 112. The communication space 111 may allow users to interact with the channel 110 or any of its posts. The communication space 111 may allow users to leave comments, provide video reactions, apply emojis to a post, apply stickers to a post, initiate a chat with the creator of the channel and/or with other members of the audience 112, or perform other actions. The communication space 111 may thus allow audience members 112 to communicate with the channel creator (e.g., user 107) as well as with other members of the audience.

The method 200 may also include generating a channel overview that provides context information related to the content channels available to the user (220). The channel overview generator 114 of computer system 101 may generate a channel overview 115 that includes context information 116 related to the channel and/or the associated posts. The context information may indicate when the last post to the channel occurred, may indicate the audience of the channel, may indicate how many audience members 112 are invited to view and interact with the channel, or other information. The channel overview 115 may also include a navigable list of the accessed content channels 117. The navigable list of content channels 117 may include a succession of channel previews or may include a text-based listing of channels or may include some other presentation of channels to which a given user may navigate. These may include open channels as well as private channels to which the user has been invited.

The method 200 may also include receiving a selection input indicating that a specified content channel has been selected from the channel overview (230) and may then include navigating to the selected content channel from the channel overview (240). The navigation module 118 of computer system 101, for example, may receive a selection input 108 from user 107 identifying a specific channel which the user wishes to see. The navigation module 118 may then navigate to the selected channel (e.g., content channel 110) and may present the content associated with the selected channel. The selected content channel may include context information that indicates to the user who is allowed to see and interact with the channel. This may help the user feel more at ease, knowing who will see their comments, reactions, and other content they choose to post in reaction to the user's channel or posts. Still further, the user may be able to navigate between channels and posts in a manner that is efficient and seamless. This manner of navigation may save the user a great deal of time when selecting and navigating to desired content. Moreover, the more efficient navigation may save computing resources as users may perform their tasks more quickly, leaving more computing resource time (e.g., CPU cycles, memory space, or network bandwidth) for other computing tasks.

Figure 3A:
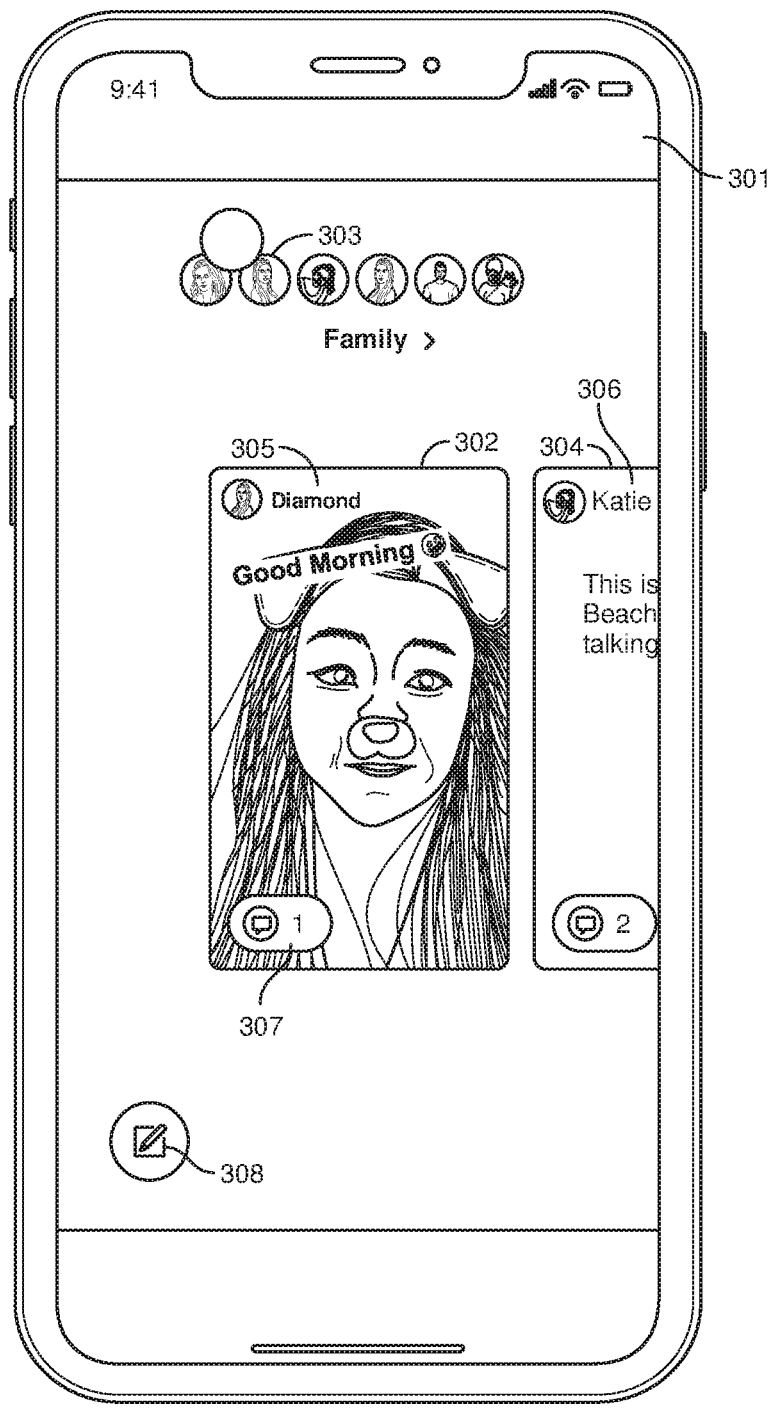
FIGS. 3A-3C illustrate example embodiments of a channel overview including an associated user interface.
Figure 3B:
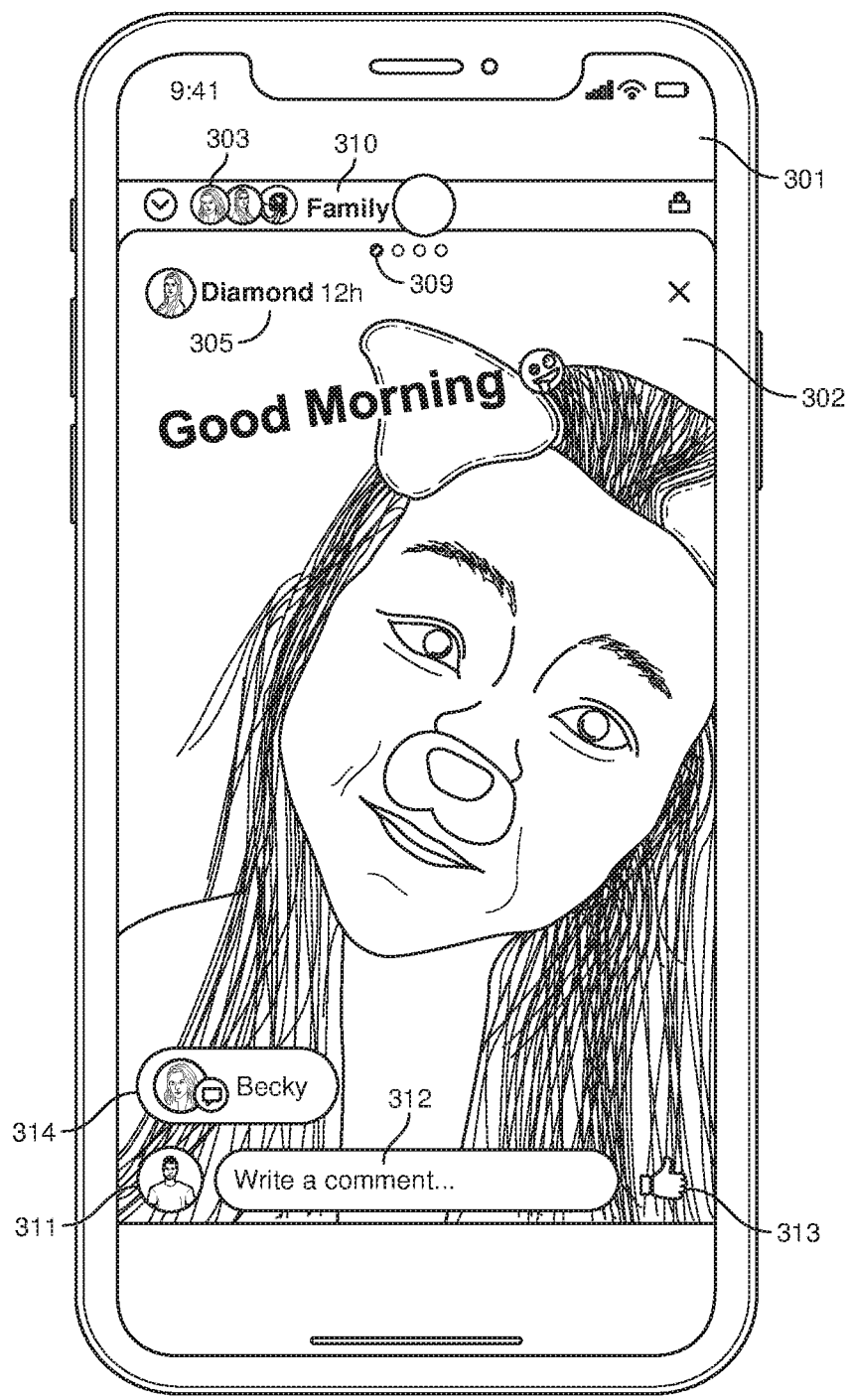
Figure 3C:
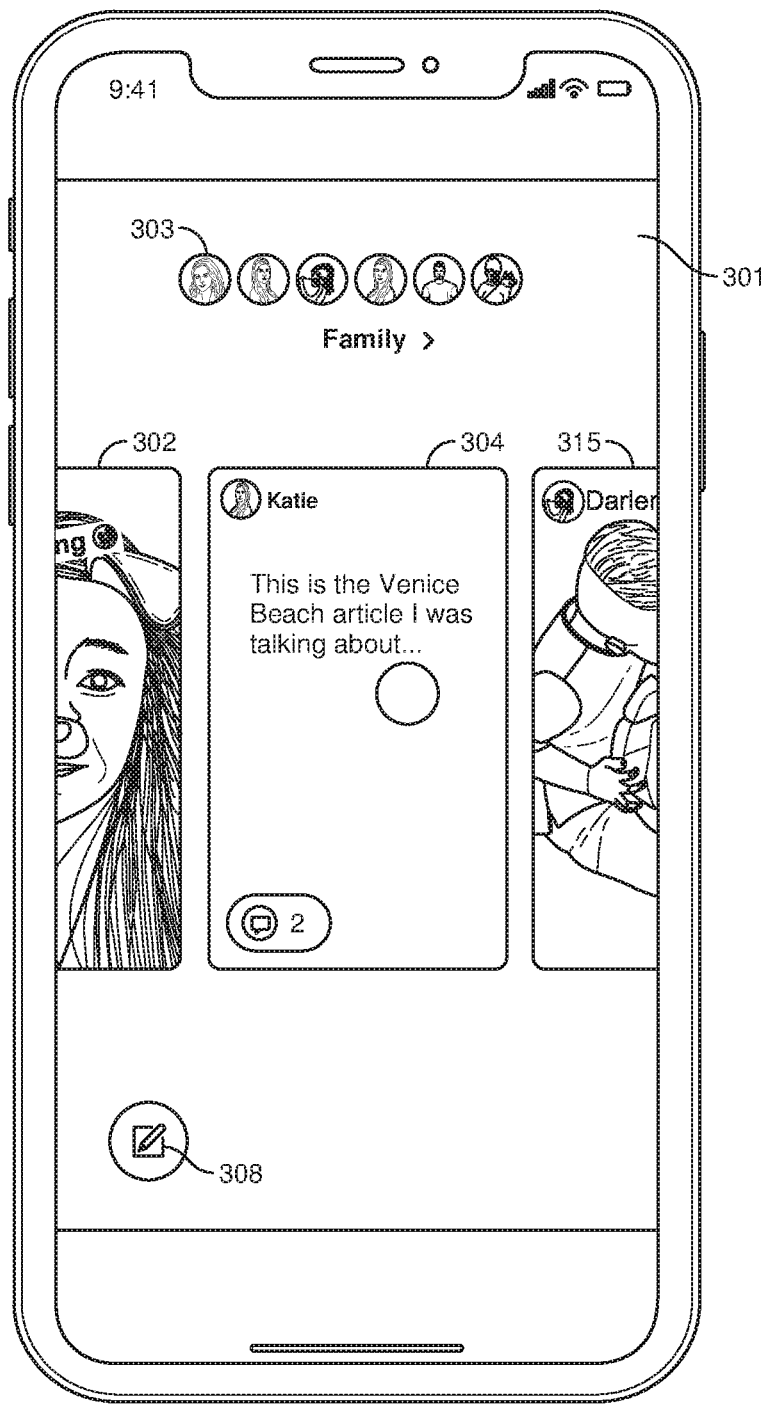

Next, FIGS. 3A-3C illustrate an embodiment of an interaction interface 301 that shows channel previews for different channels. These channels previews (e.g., 302 and 304) (or "channel preview cards" herein) may be shown in the channel overview level of the interaction interface 301. In addition to the channel previews 302 and 304, the channel overview may include information for at least one of the content channels available to a given user. For example, user 107 of FIG. 1 may have access to content channels 302 and 304 created by Diamond 305 and Katie 306, respectively. Channel 302 may have one comment (or one new comment) as shown by indicator 307, while channel 304 may have two comments. Other context information may also be shown at the channel level including an indication of channel audience members, an indication of channel content type, amount of activity related to the channel, or other information.

For example, as shown in FIG. 3B, an indicator 310 may show who has access to Diamond's channel 302. The indicator 310 may show, for instance, that the channel 302 is open to "Family." This definition of family may be defined by the creator and may be stored in settings or policies 124 in content platform 120 of FIG. 1. In some embodiments, the channel overview may include images or other representations 303 of those persons that are part of the "Family" audience that have access to channel 302.

The channel 302 may have multiple different social media posts as indicated by user interface element 309. In FIG. 3B, the user interface element 309 may indicate that content channel 302 has four posts and that the user is currently viewing the first of the four posts. Swiping to the right or otherwise providing a navigation input may navigate the viewing user to the other posts in the content channel 302. At this post level, users may navigate through different posts and interact with those posts until they are ready to exit the channel and browse to a new channel (e.g., content channel 304 of FIG. 3A).

The interaction interface 301 may allow many different types of interaction with a given post or series of posts within a channel. For example, user interface element 314 may show comments or other post responses from a user named Becky who is part of the creator's "Family" group. Clicking or otherwise selecting this user interface element 314 may bring up a user interface overlay that shows Becky's text-based, picture-based, video-based, or other type of comments. The viewing user 311 may also be provided with a user interface element 312 that allows the viewing user to comment on a user's post 302. Still further, other interaction elements such as 313 may allow the viewing user to apply emojis, stickers, or other forms of interaction with the underlying post.

Once the user has finished viewing and/or interacting with the posts in channel 302, the viewing user 311 may return to the channel overview in interaction interface 301, as shown in FIG. 3C. The user may provide navigation inputs to scroll through different channels and may provide a selection input to select a channel to view (e.g., channel 304). In some embodiments, the channels shown to the viewing user 311 may be those that are created by members of the "Family" group 303. Thus, channel 304 may be a channel created by a Family member Katie (306), and channel 315 may be created by a Family member Darlene. In this manner, the viewing user may browse channels at the channel overview level and browse individual posts within the channels at the post level. Once the user is finished browsing channels within this "Family" group, the user may browse up to the channel feed level where the user may see content channels from many different users as well as channels that are open to the public.

At the channel overview level (shown in FIGS. 3A and 3C), the viewing user 311 may also be provided with an option to create their own content. This content may be added to the existing content of the channel. For example, the viewing user 311 may implement user interface element 308 to add their own posts to a given channel if permitted by the channel creator. Thus, the viewing user could add pictures, videos, text, web pages, or other content in one or more posts that may be added to those channels to which the viewing user has access. This new content may be added as new posts appended to the existing posts or may be added as supplemental content to the existing posts. This supplemental content may be displayed next to or overlaid onto the existing posts in the form of comment boxes, stickers, emojis, or other content. In some cases, if a content channel creator does not wish for other audience members to add posts or other content to a channel, the creator may be able to configure this feature in policies 124.

In some embodiments, as noted above, the systems herein may include three (or more) hierarchical navigational levels. Users of these systems may be able to navigate seamlessly from a channel feed level to a channel overview level to a post level and back. The channel feed level may illustrate multiple different channels in a channel feed view including open channels and private channels to which the user has access. From the channel feed level, the user may select a certain channel and navigate to that channel. At this channel overview level, the user may interact with the channel itself, with other audience members of the channel, or with the individual posts of the channel. This channel overview may be presented in a user interface between the channel feed view and the various individual posts of the selected channel. Upon selecting a specific post, the user may be navigated to the post level where the user may interact with the post including adding comments, pictures, video replies, stickers, emojis, likes, thumbs up, or by interacting in some other way with the post.

Thus, the channel feed view, the channel overview, and the individual posts may each be or represent a hierarchical level in the user interface. In some embodiments, the user interface (e.g., 301) may allow users to navigate from content channel to content channel at each hierarchical level of the user interface including the channel feed view, the channel overview, and the individual post view. In at least some cases, this navigation from channel to channel at each hierarchical level of the user interface may be performed without first changing hierarchical levels. Thus, in one example, the user may navigate from one content channel to another content channel while in the channel feed view or may do the same while in the channel overview or may do the same while in the post view. Thus, users may be able to navigate between content channels regardless of their current hierarchical navigational level and may do so without first changing levels. Accordingly, even in the post view where users typically view individual posts within a channel, the systems described herein may provide user interface elements that allow the user to navigate to a new channel from within the post view.

Moreover, the systems described herein may allow users to navigate straight from a post to a channel feed view or straight from a channel feed view to a post. While the navigational, hierarchical levels may be used to organize and present different types of data (e.g., channels and posts), navigation through the hierarchical levels may not necessarily occur in a binary fashion. User interface elements may be provided to allow the user to shortcut directly from a channel feed view to an individual post without first seeing the channel overview. In other, alternative embodiments, a more rigid form of navigating from level to level may be enforced, such that all movement between hierarchical levels flows through the channel overview. This may be configured by each content channel creator in policies 124.

A corresponding system for generating and presenting a channel overview may include at least one physical processor and physical memory comprising computer-executable instructions that, when executed by the physical processor, cause the physical processor to access various content channels available to a user, where each content channel includes a communication space having at least one specified type of content and an audience with various specified audience members. The physical processor may also generate a channel overview that provides context information related to the content channels available to the user. The channel overview may include a navigable list of the accessed content channels. The physical processor may further receive a selection input indicating that a specified content channel has been selected from the channel overview and then navigate to the selected content channel from the channel overview.

Figure 4:
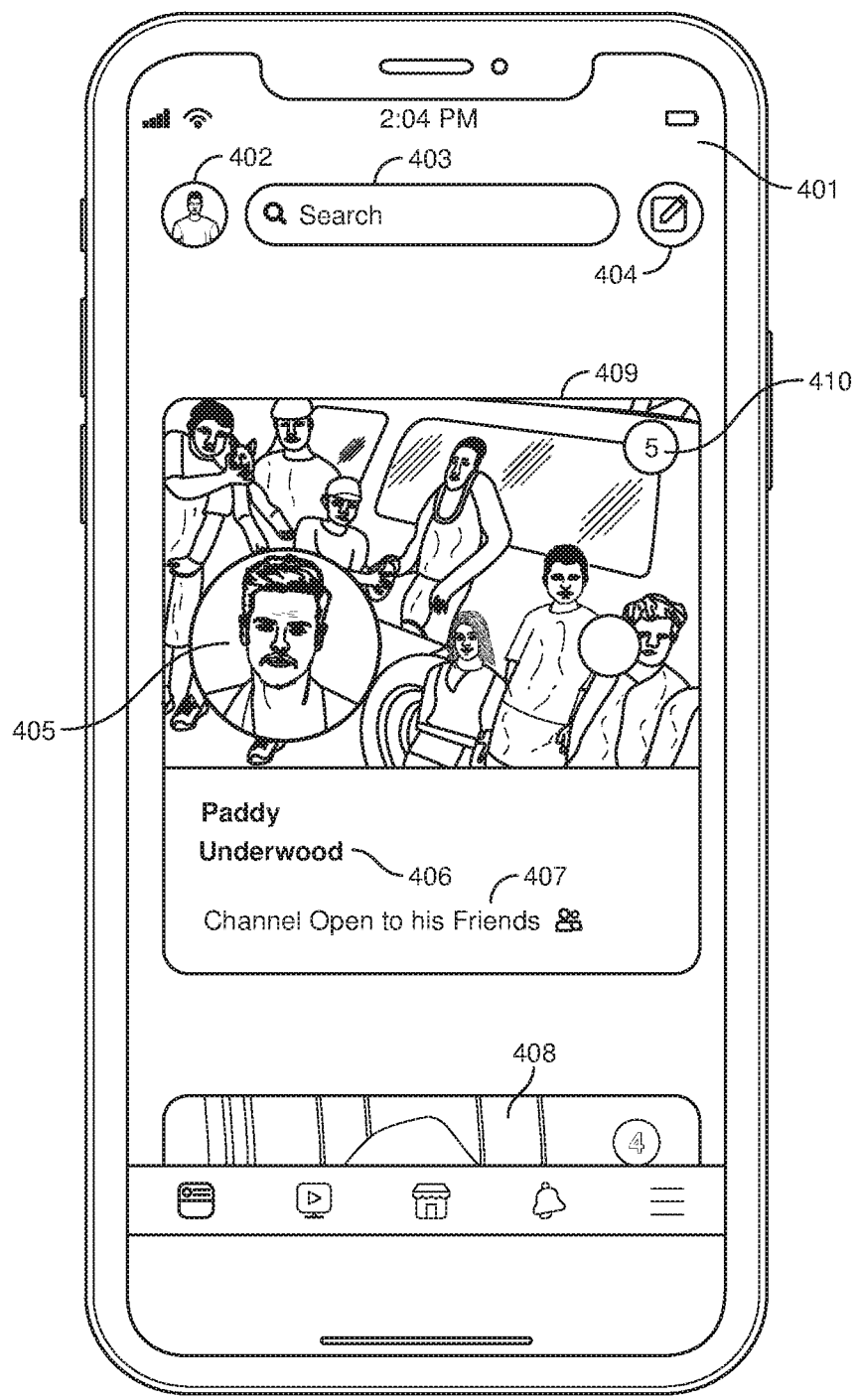
FIG. 4 illustrates an alternative example embodiment of a channel overview including an associated user interface.

Turning now to FIG. 4, a user interface 401 is illustrated that provides access to various content channels and provides further access to user interface elements that allow interaction with the channels' related posts. User interface 401, for example, may be configured to present a channel preview card 409. The channel preview card 409 may include various indications of the channel creator. For instance, the channel preview card 409 may include an image or representation of the creator 405, along with written text 406 identifying the creator's name. The channel preview card 409 may include an indicator 410 of the number of posts available in the channel (e.g., five posts). The channel preview card 409 may further include an indicator 407 of those to whom the channel is available. In the embodiment shown in FIG. 4, the content channel is indicated as being open to the creator's friends. In some embodiments, an image or representation of one or more of these friends may be shown in the channel preview card 409. Other channels (e.g., 408) may also be shown in the channel overview of user interface 401, along with other user interface elements including image 402 potentially identifying the viewing user who is viewing the channel 409, a search bar 403 allowing the viewing user to search through channels available to the viewing user, as well as a new post user element 404 that allows the viewing user to create a new post, a new channel, a new comment, or create other content.

Figure 5:
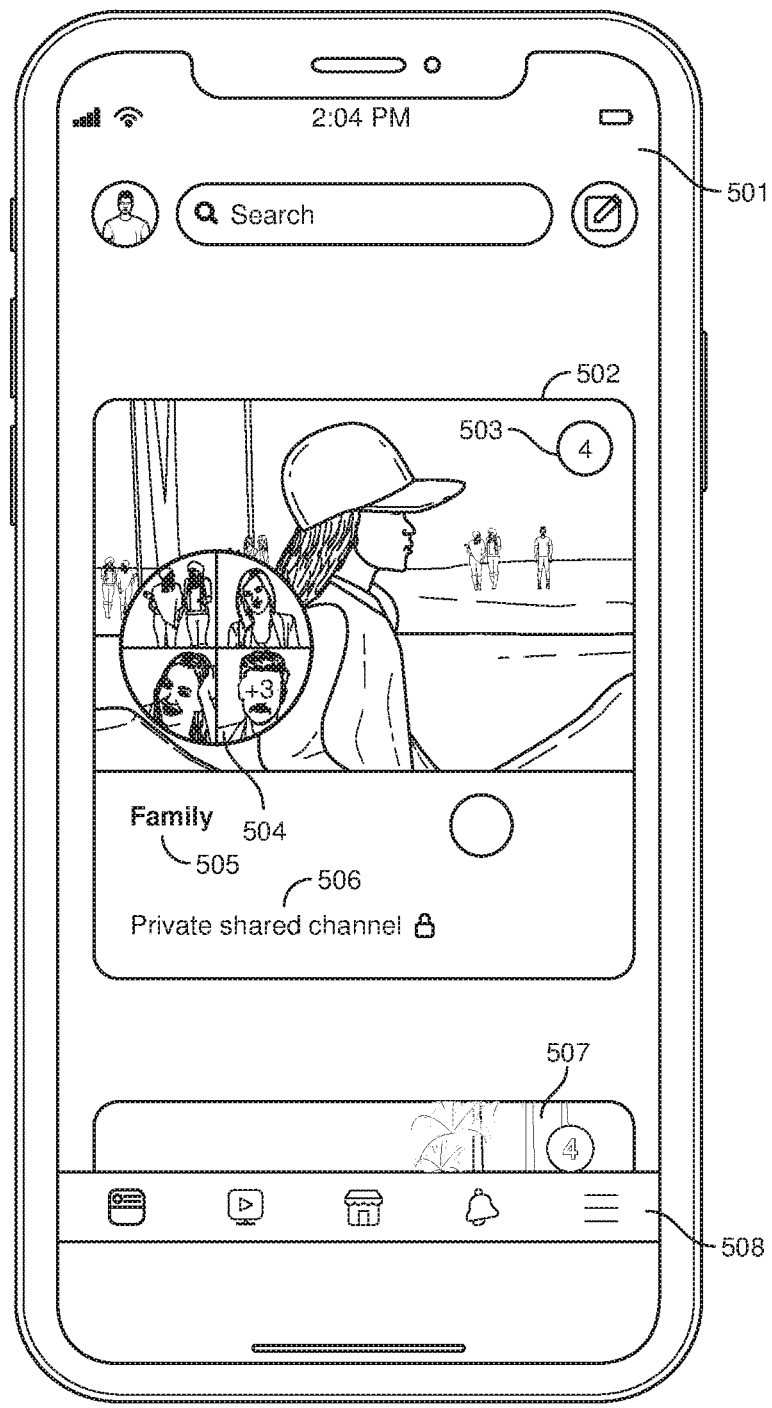
FIG. 5 illustrates an alternative example embodiment of a channel overview including an associated user interface.

FIG. 5 illustrates an embodiment in which the user interface 501 provides access to a private channel. The channel preview card 502 of user interface 501 may provide indicators similar to those shown in FIG. 4. The channel preview card 502 may include an indicator 503 illustrating how many posts are included in the previewed channel. The channel preview card 502 may also include a visual indicator 504 and a textual indicator 505 identifying at least some of those persons that have access to the content channel represented by preview card 502. The visual indicator 504 may show images of those users that have access to the content channel, and the textual indicator may indicate the group or individuals to whom the channel is available ("Family" in this case). The indicator 506, for instance, may indicate that the channel is private and is shared only among certain people including members of the channel creator's family. The user interface 501 may also include other channel preview cards 507 as well as other user interface elements 508 that allow viewing users to interact with the channels and posts presented in the user interface 501.

Figure 6A:
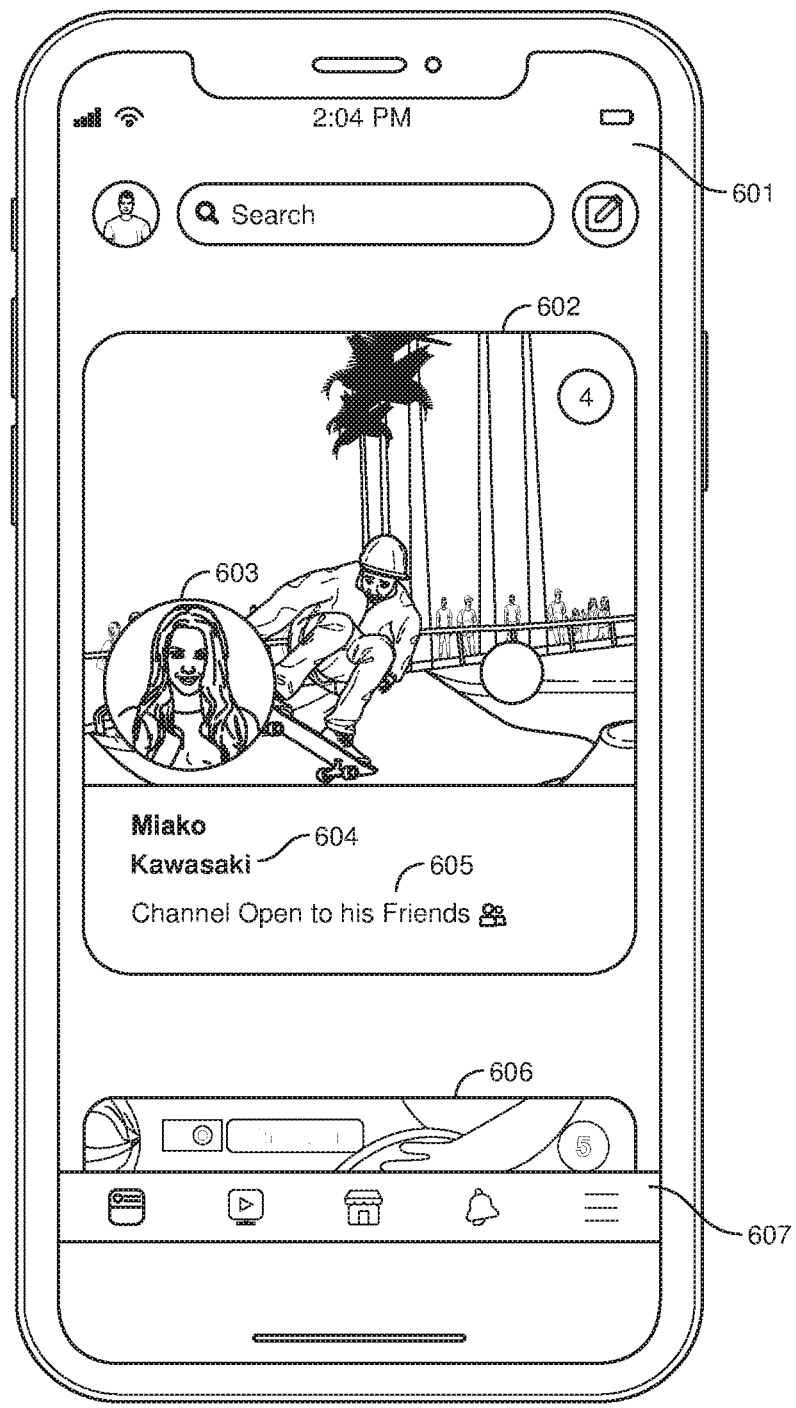
FIGS. 6A-6D illustrate alternative example embodiments of a channel overview in which various posts are presented.
Figure 6B:

FIGS. 6A-6D illustrate embodiments in which a user may navigate through various channels and posts using different navigation techniques. FIG. 6A, for example, illustrates a user interface 601 that provides access to at least two content channels represented by channel preview cards 602 and 606, respectively. The content channels represented at this channel overview layer may have been created by Miako Kawasaki, as indicated at 604. The content channel 602 may be available to Miako's friends but may be otherwise unavailable to other users. From this channel overview, users may be able to interact with the channels 602/606 via user interface elements 607. If the user selects the content channel 602, the user may be taken to a post level as shown in FIG. 6B. In some cases, selecting a post may cause the post to be expanded to substantially fill the user's screen. Unselecting the post may cause the post to revert back to its original size.

The post level of content channel 602 may include an indication 608 of other posts that are part of the channel. The indicator 608 may illustrate that, in the example shown in FIG. 6B, the content channel has 11 posts. The posts may be arranged in chronological order or in some other order specified by the channel creator. The indicator 609 may provide an image or representation of the channel's creator, and indicator 610 may indicate who the channel is available to and how long ago each post was uploaded. The content channel 602 may include pictures, videos, text or other content at each post. Viewing users (e.g., 611) may provide comments via a comment bar 612 and may also provide likes via user interface element 613. Users may thus interact with each post at the post level and may also interact with each channel at the channel overview level. When users interact with the various channels and posts, they do not need to wonder about who will see the comments, posts, or other reactions. Indeed, many different indicators may illustrate, for each post or channel, who that channel or post is open to and who can interact with the channel or post. This may help the users to feel comfortable in sharing their ideas and content.

Figure 6C:
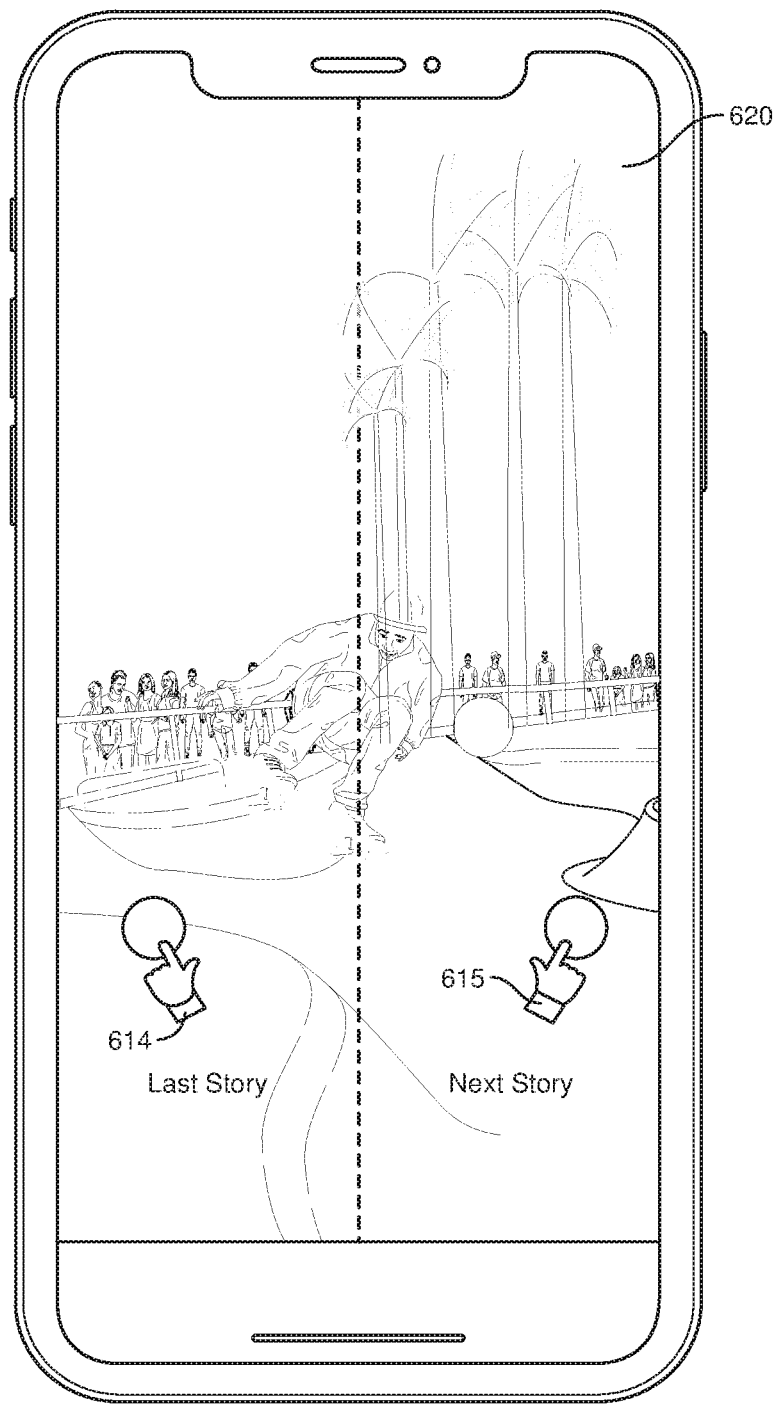

In some embodiments, a means of navigating through different channels or posts may be hidden within a user interface until a specified input is received at the user interface from a user. For example, as shown in FIG. 6C, a user may have provided a specified input at the user interface shown in FIG. 6B (e.g., user interface 601). Upon providing this input (e.g., selecting a specific user interface element such as a button or slider knob or by providing a gesture such as a swipe up or swipe left), the user interface 601 may provide an overlay interface 620 that replaces the original interface 601 or is overlaid on top of the original user interface, allowing the user to still see the underlying post. The overlay interface 620 may include navigational elements including 614 and 615. Navigational element 614 may, when selected, navigate the user to the previous story or previous post in the content channel. Navigational element 615 may, when selected, navigate the user to the next story or next post in the content channel. Other navigational elements may also be provided in the overlay interface including elements that navigate the user back to the channel overview or back to a channel feed view. In this manner, an overlay interface may help the viewing user to easily navigate between posts, between channels, and between hierarchical navigational levels.

Figure 6D:

In some embodiments, other types of navigation views or even post level views or channel overviews may be hidden within a user interface until a specified input is received at the user interface from a user. This input may allow the user to have access to certain views, menus, user interface elements, or other items that are initially hidden in the user interface 601. FIG. 6D illustrates an embodiment in which the user has used the overlay interface 620 to navigate to the next post in the content channel 602. The user may have selected navigational element 615 of FIG. 6C, prompting the system to navigate the user to the next post in the content channel. The movement between posts may be indicated in the updated indicator 608 of FIG. 6D. This post may include comments (e.g., comment 616 by Steph) that were not associated with previous posts. Thus, as a user scrolls through the posts of a channel, the user may see comments and other user interactions that are specific to each post. Accordingly, because Steph's comment applied to the post of FIG. 6D, it is shown at 616 in relation to that post and not to other posts (as indicated by the absence of Steph's comment in the post of FIG. 6B). In other embodiments, when a post has received multiple comments, a highest-ranked or most relevant comment may be shown with the post in a prominent position such as 616 of FIG. 6D.

Figure 7A:
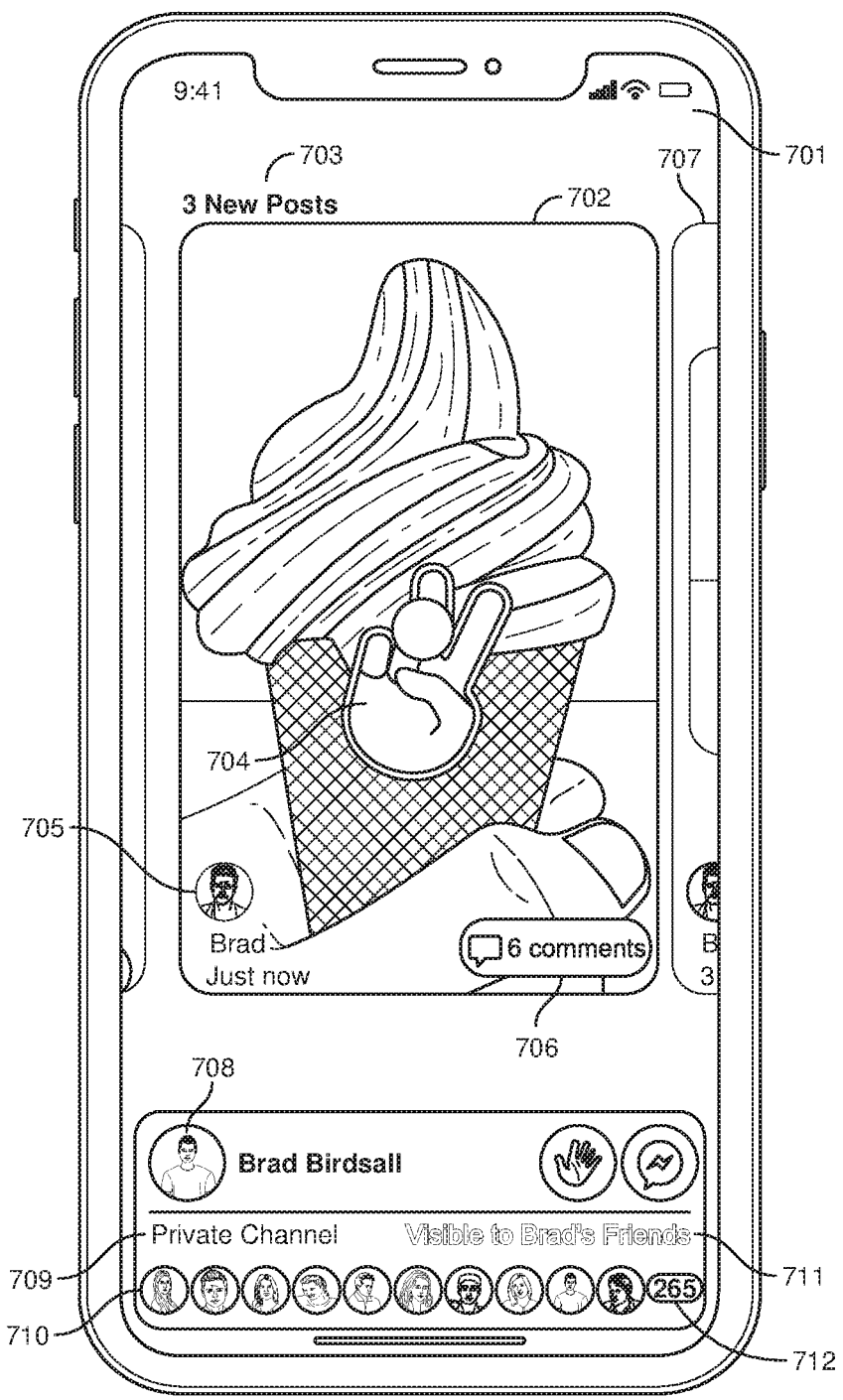
FIGS. 7A-7C illustrate alternative example embodiments of a channel overview including an associated user interface.
Figure 7B:
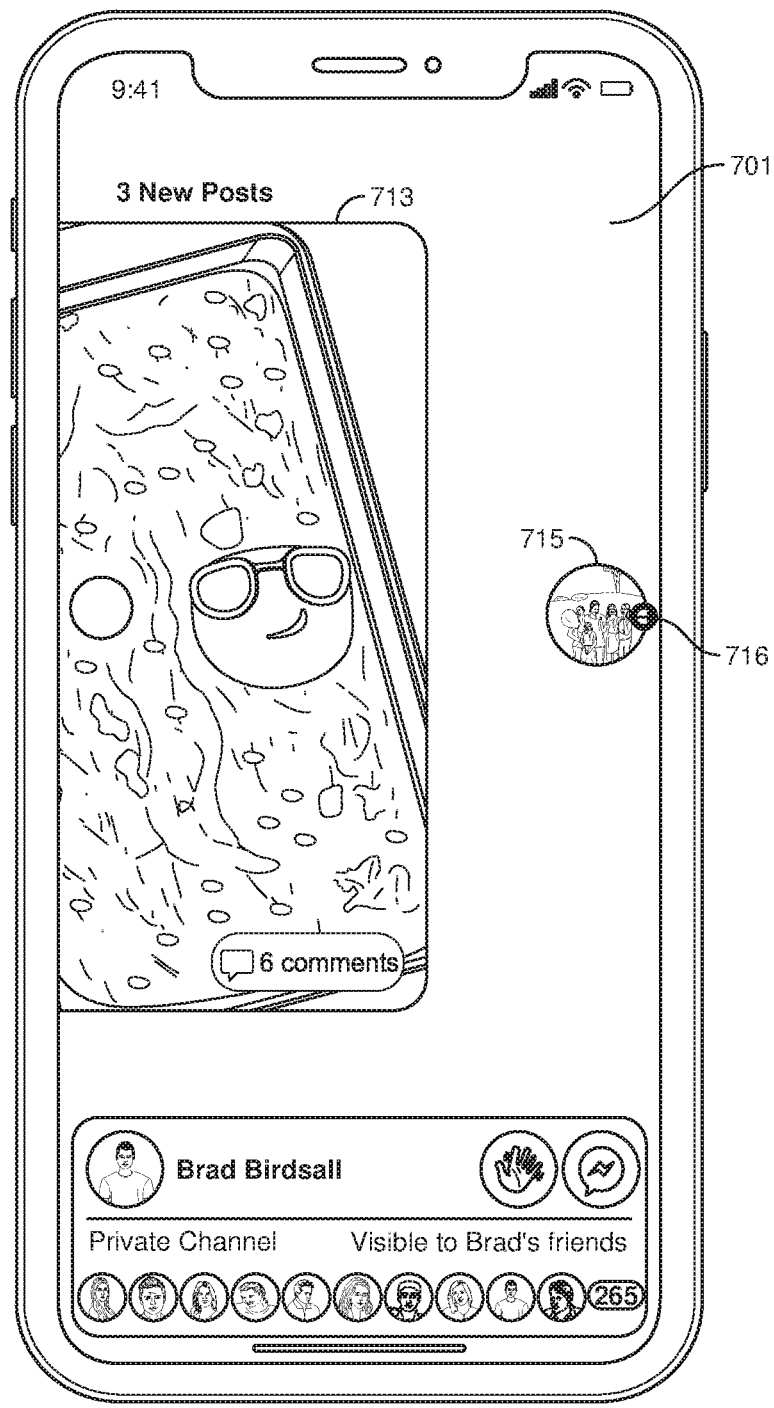
Figure 7C:
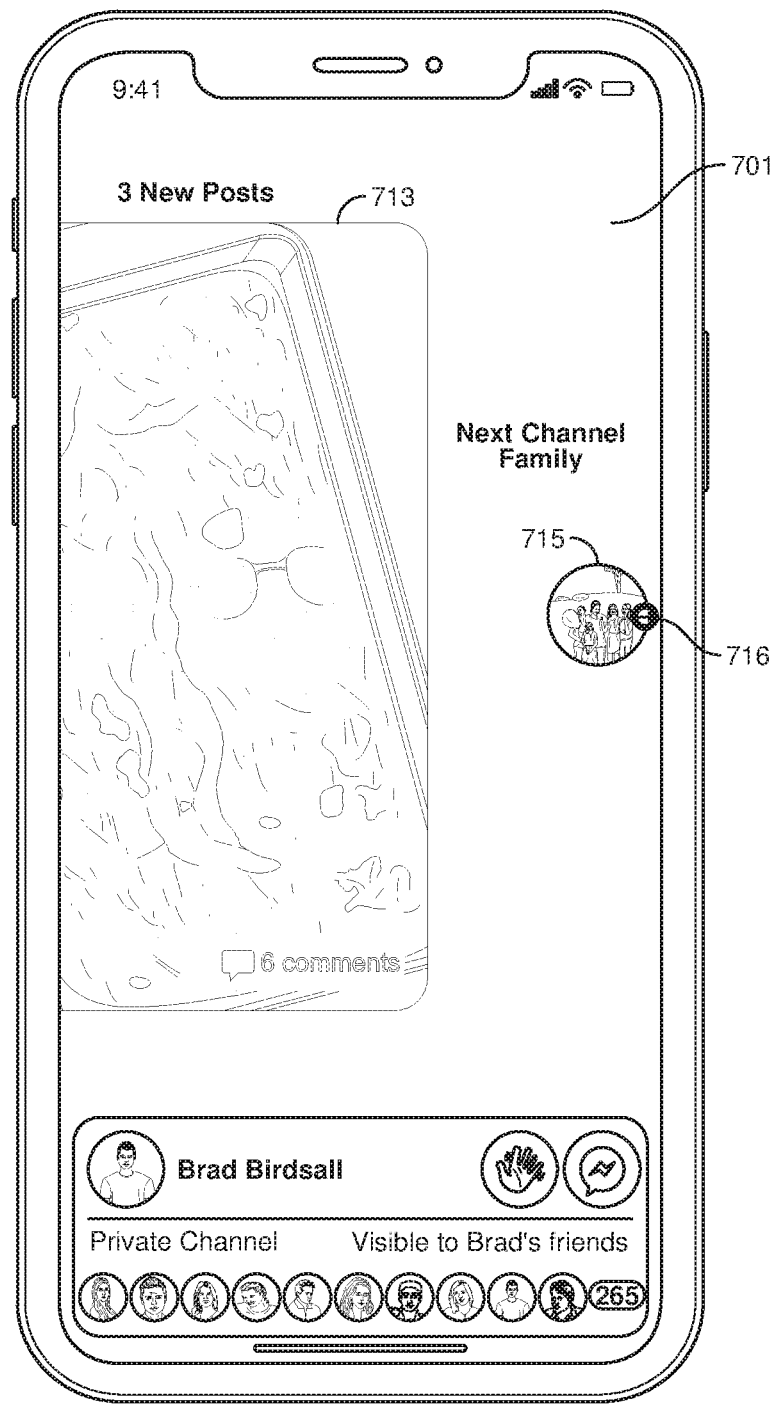

FIGS. 7A-7C illustrate an example embodiment in which a user may navigate through different channels, posts, and/or hierarchical navigational levels using an alternative user interface. FIG. 7A illustrates a user interface 701 with multiple channel preview cards 702 and 707. The channel preview cards may be arranged in a navigable list of content channels. In some cases, this list is a sequential list of content channels where each channel is represented by a different preview card (e.g., 702 or 707). In some cases, this channel overview may be presented at a channel overview level that is oriented at the bottom of a user interface presented in a display screen, as generally shown in FIGS. 7A-7C. Orienting the channel overview in this manner may allow for more simplified and intuitive interaction from the user's thumbs or other fingers when the user interface is displayed in a smartphone or tablet.

Indicators positioned within the user interface 701 may provide many different types of information for the viewing user. For example, indicator 703 may illustrate the number of new posts in content channel 702. Indicator 705 may show an image or representation of the channel's creator. Indicator 704 may show a sticker applied to the channel preview card. Indicator 706 may show the number of comments associated with the channel or associated with individual posts. Indicator 708 may identify the channel creator (e.g., Brad Birdsall), while indicator 709 may indicate whether the channel is open or private. If the channel is private, indicator 711 may show who the channel is accessible to. Indicator 710 may illustrate one or more images of those audience members of the content channel. Indicator 712 may indicate how many total audience members there are for this channel created by Brad. Thus, the various user interface elements of interface 701 may concisely show who created the channel, what the channel is about, and who can see the channel.

The user interface 701 may provide different navigational user interface elements, as shown in FIG. 7B. For example, if a user is viewing multiple different channels and comes to the end of a sequential list of channels, a navigational user interface element 715 may be presented that shows an image or representation of a user group (e.g., "Family"). If a user selects the navigational user interface element 715, the user may be navigated in the direction shown by indicator 716. In some embodiments, as shown in FIG. 7C, the navigational user interface element 715 may be configured to fade into view upon reaching the end of the sequential list of channels. In cases where the navigational user interface element 715 fades into view, the last channel preview card in the list (e.g., 713) may simultaneously fade out of view. In such embodiments, the navigational user interface element 715 may thus be fully visible, while the last channel preview card 713 fades to where its nearly invisible or is totally removed from the user interface.

Figure 8:
FIG. 8 illustrates an alternative example embodiment of a channel overview including an associated user interface.

FIG. 8 illustrates an example embodiment of a user interface 801 that is shown at a post level. The post may include text, video, pictures, or other content. The posts in this interface 801 may be indicated by a different type of indicator such as that referenced by 802. The bar 802 may indicate that this channel has five different posts and that the user is currently viewing the fifth post. The viewing user may also be able to see other user's comments via a comments interface 803. Furthermore, the viewing user may be able to provide their own comments using comment bar 804. In some cases, either or both of the post level or the overview level may provide additional information related to a specific channel upon receiving a specified user input at the user interface 801. Thus, for example, a user may provide a specified input (e.g., a long-press of a channel preview card) and the user interface 801 may provide additional information related to that channel or may provide access to comments or other users' interactions, etc.

Figure 9A:
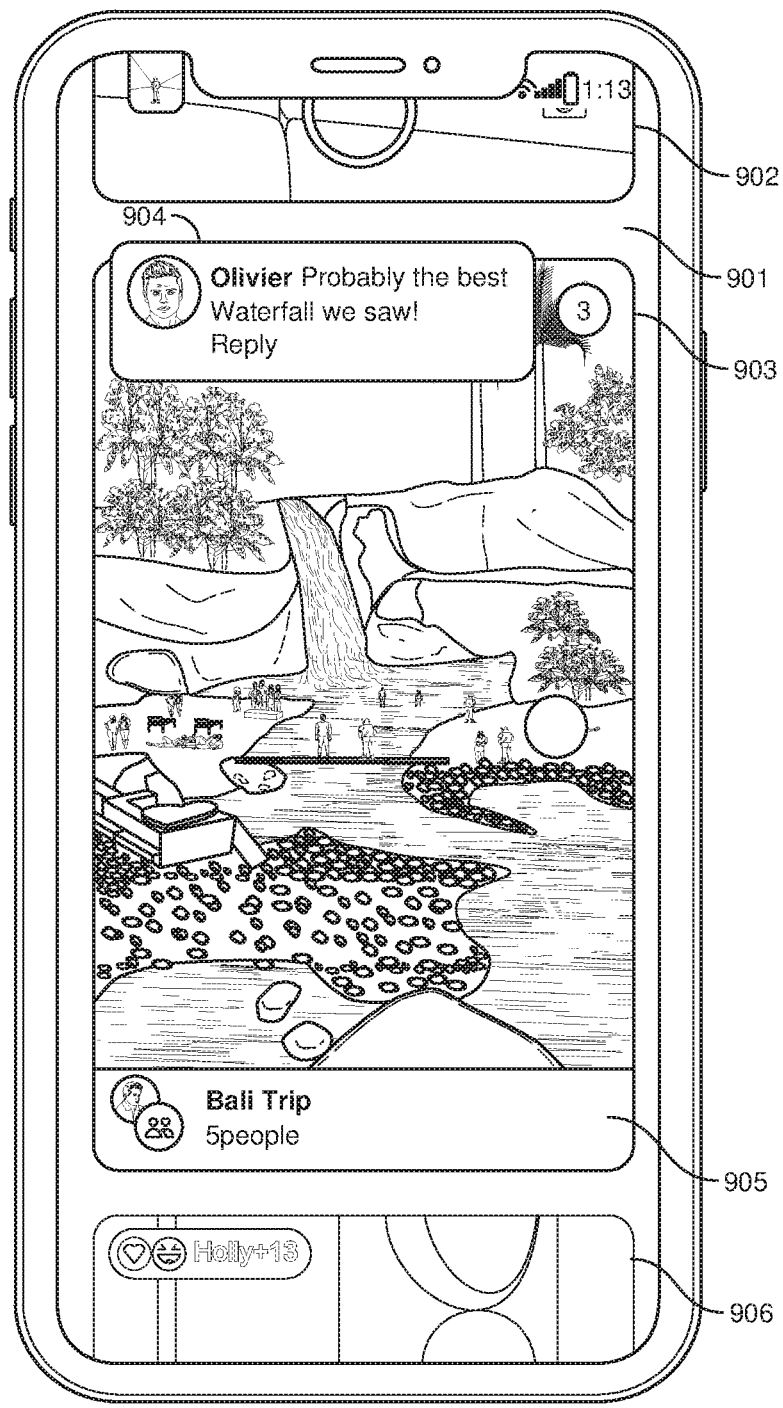
FIGS. 9A-9B illustrate alternative example embodiments of a channel overview including an associated user interface.
Figure 9B:
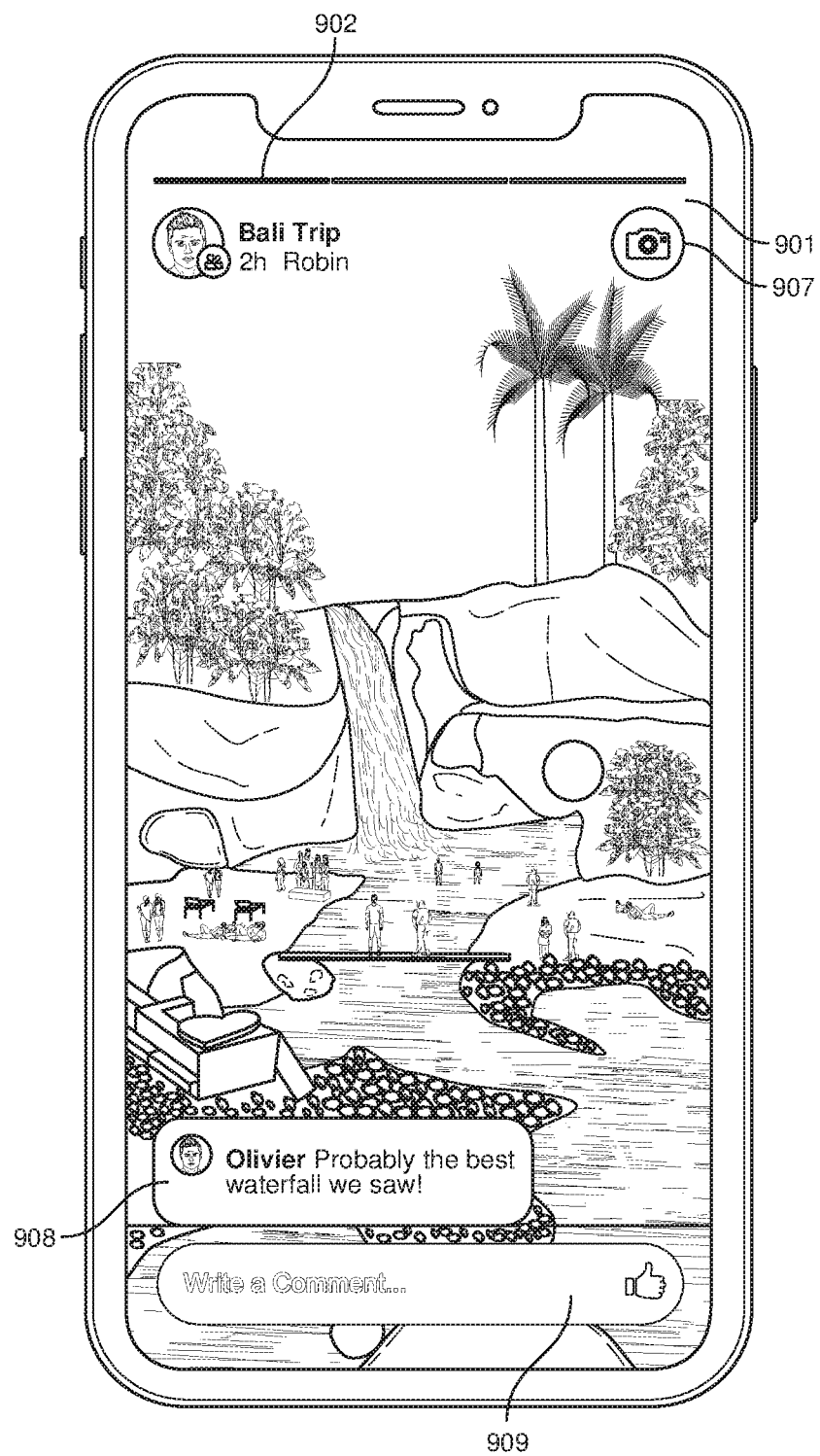

FIGS. 9A and 9B illustrate an embodiment of an alternative interface for viewing content channels and posts. FIG. 9A, for example, illustrates a user interface 901 in a channel feed view with different channel preview cards 902, 903, and 906. Other indicators such as comment box 904 may provide an indication of a top comment associated with that channel. Clicking on this comment box 904 may present other comments related to that channel. Interface element 905 may indicate a subject for the channel (e.g., "Bali Trip") and may further indicate how many people are part of the channel's audience. Within this interface 901, users may browse through different content channels by swiping up or down. Users may enter a given channel by selecting that channel with a touch input, voice input or similar interface interaction.

Upon selecting the "Bali Trip" channel 903, the viewing user may be navigated to a post level that shows the first post in the channel. The post-level view may include an indicator 902 showing which post the user is currently viewing, as well as other indicators such as comment box 908 showing a comment related to the post and a comment input bar 909 which may allow users to add their own comments to the post. Other user interface elements (e.g., 907) may allow users to add their own photos to the channel. Thus, a group may take a trip to a place such as Bali and may share their photos, comments, and their reactions to each other's posts in a way that is both private to the group and meaningful.

Accordingly, the embodiments described herein may provide a user interface with navigational features and other elements that allow users to easily post content to well-defined groups in an intuitive and efficient manner. The embodiments described herein may provide a user interface with a channel overview that may reside between a channels feed level and a post level. The channel overview may help orient users, indicating for each channel who the channel belongs to, what type of content is posted in the channel, who is authorized to view the channel, the number of interactions users have had with the channel, etc. The channel overview may also allow users to interact with channels, with individual posts, and with other audience members. Thus, in this manner, users may more easily post and view content, navigating through the various levels in a manner that is easy to learn and easy to use on a daily basis.

In one example, a computer-implemented method for generating and presenting a channel overview may include accessing content channels available to a user, where each content channel includes a communication space with at least one specified type of content and an audience with various audience members. The method may also include generating a channel overview that provides context information related to the content channels available to the user. The channel overview may include a navigable list of the accessed content channels. The method may further include receiving a selection input indicating that a specified content channel has been selected from the channel overview. The method may also include navigating to the selected content channel from the channel overview.

In some examples, the channel overview may provide information for at least one of the content channels available to the user including an indication of a channel creator, an indication of channel audience members, an indication of channel content type, or an amount of activity related to the channel.

In some examples, the channel overview may allow navigation to a channel feed level that may provide access to one or more specified content channels. In some examples, the channels available to the user may be presented as a feed in a channel feed view that shows multiple channels. In some examples, the channel overview may be presented in a user interface between the channel feed view and various individual posts of a selected channel created by a user.

In some examples, the channel feed view, the channel overview, and the individual posts may each be or represent a hierarchical level in the user interface. In some examples, the user interface may allow users to navigate from content channel to content channel at each hierarchical level of the user interface including the channel feed view, the channel overview, and the individual post view. In some examples, the user interface may allow users to navigate from content channel to content channel at each hierarchical level of the user interface without first changing hierarchical levels.

In some examples, the channel overview may be presented at a channel overview level that is oriented at the bottom of a user interface presented in a display screen. In some examples, a user may navigate between content channels at the channel overview level from a first post to a second, different post. In some examples, the overview may provide additional information related to a specific channel upon receiving a specified user input at the user interface.

In addition, a corresponding system for generating and presenting a channel overview may include at least one physical processor and physical memory comprising computer-executable instructions that, when executed by the physical processor, cause the physical processor to access various content channels available to a user, where each content channel includes a communication space having at least one specified type of content and an audience with various specified audience members. The physical processor may also generate a channel overview that provides context information related to the content channels available to the user. The channel overview may include a navigable list of the accessed content channels. The physical processor may further receive a selection input indicating that a specified content channel has been selected from the channel overview and then navigate to the selected content channel from the channel overview.

In some examples, the channel overview may be hidden within a user interface until a specified input is received at the user interface from a user. In some examples, the specified user input may be received at a specified level within the user interface. In some examples, the user interface may include three levels including a channel feed level, a channel overview level, and a post level. In some examples, the user interface may allow users to navigate between content channels at the channel feed level, at the channel overview level, and at the post level.

In some examples, the user interface may illustrate the navigable list of accessed content channels. In some examples, the user interface may illustrate a sequential list of content channels, where each content channel is represented by a card. In some examples, one or more of the cards may indicate information associated with the content channel including an indication of audience members for the content channel.

In some examples, the above-described method may be encoded as computer-readable instructions on a computer-readable medium. For example, a computer-readable medium may include one or more computer-executable instructions that, when executed by at least one processor of a computing device, may cause the computing device to access various content channels available to a user, where each content channel includes a communication space having at least one specified type of content and an audience with various specified audience members. The computing device may also generate a channel overview that provides context information related to the content channels available to the user. The channel overview may include a navigable list of the accessed content channels. The computing device may further receive a selection input indicating that a specified content channel has been selected from the channel overview and then navigate to the selected content channel from the channel overview.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to generate a channel overview, use the result of the transformation to navigate the channel overview, and store the result of the transformation after the navigation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:
1. A computer-implemented method comprising:
accessing one or more content channels available to a user, each content channel comprising a communication space including at least one specified type of content and an audience with one or more specified audience members;
generating a channel overview that provides context information related to the content channels available to the user, the channel overview comprising a navigable list of the one or more accessed content channels, the channel overview including a representation of those users that are permitted to view or interact with a channel currently being viewed, the channel overview being part of a user interface that has multiple hierarchical levels, a plurality of which have different navigational user interface elements that are specific to each hierarchical level, wherein the user interface allows users to navigate between content channels at each hierarchical level of the user interface without first changing hierarchical levels;
receiving a selection input indicating that a specified content channel has been selected from the channel overview; and navigating to the selected content channel from the channel overview.

2. The computer-implemented method of claim 1, wherein the channel overview provides information for at least one of the content channels available to the user including an indication of a channel creator, an indication of channel audience members, an indication of channel content type, or an amount of activity related to the channel.

3. The computer-implemented method of claim 1, wherein the channel overview allows navigation to a channel feed level providing access to one or more specified content channels.

4. The computer-implemented method of claim 1, wherein the channels available to the user are presented as a feed in a channel feed view that shows multiple channels.

5. The computer-implemented method of claim 4, wherein the channel overview is presented in a user interface between the channel feed view and one or more individual posts of a selected channel created by a user.

6. The computer-implemented method of claim 5, wherein the channel feed view, the channel overview, and the individual posts each comprise a hierarchical level in the user interface.

7. The computer-implemented method of claim 6, wherein the user interface allows users to navigate from content channel to content channel at each hierarchical level of the user interface including the channel feed view, the channel overview, and the individual post view.

8. The computer-implemented method of claim 1, wherein the user interface illustrates a sequential list of content channels, each content channel being represented by a card.

9. The computer-implemented method of claim 1, wherein the channel overview is presented at a channel overview level that is oriented at the bottom of a user interface presented in a display screen.

10. The computer-implemented method of claim 9, wherein a user navigates between content channels at the channel overview level from a first post to a second, different post.

11. The computer-implemented method of claim 10, wherein the overview provides additional information related to a specific channel upon receiving a specified user input at the user interface.

12. A system comprising:
at least one physical processor; and
physical memory comprising computer-executable instructions that, when executed by the physical processor, cause the physical processor to:
access one or more content channels available to a user, each content channel comprising a communication space including at least one specified type of content and an audience with one or more specified audience members;
generate a channel overview that provides context information related to the content channels available to the user, the channel overview comprising a navigable list of the one or more accessed content channels, the channel overview including a representation of those users that are permitted to view or interact with a channel currently being viewed, the channel overview being part of a user interface that has multiple hierarchical levels, a plurality of which have different navigational user interface elements that are specific to each hierarchical level, wherein the user interface allows users to navigate between content channels at each hierarchical level of the user interface without first changing hierarchical levels;
receive a selection input indicating that a specified content channel has been selected from the channel overview; and
navigate to the selected content channel from the channel overview.

13. The system of claim 12, wherein the channel overview is hidden within a user interface until a specified input is received at the user interface from a user.

14. The system of claim 13, wherein the specified user input is received at a specified level within the user interface.

15. The system of claim 13, wherein the user interface includes three levels including a channel feed level, a channel overview level, and a post level.

16. The system of claim 15, wherein the user interface allows users to navigate between content channels at the channel feed level, at the channel overview level, and at the post level.

17. The system of claim 13, wherein the user interface illustrates the navigable list of accessed content channels.

18. The system of claim 17, wherein the user interface illustrates a sequential list of content channels, each content channel being represented by a card.

19. The system of claim 18, wherein one or more of the cards indicates information associated with the content channel including an indication of audience members for the content channel.

20. A non-transitory computer-readable medium comprising one or more computer-executable instructions that, when executed by at least one processor of a computing device, cause the computing device to:
access one or more content channels available to a user, each content channel comprising a communication space including at least one specified type of content and an audience with one or more specified audience members;
generate a channel overview that provides context information related to the content channels available to the user, the channel overview comprising a navigable list of the one or more accessed content channels, the channel overview including a representation of those users that are permitted to view or interact with a channel currently being viewed, the channel overview being part of a user interface that has multiple hierarchical levels, a plurality of which have different navigational user interface elements that are specific to each hierarchical level, wherein the user interface allows users to navigate between content channels at each hierarchical level of the user interface without first changing hierarchical levels;
receive a selection input indicating that a specified content channel has been selected from the channel overview; and
navigate to the selected content channel from the channel overview.

* * * * *